United States Patent [19]

Sudhakar et al.

[11] Patent Number: 5,472,595
[45] Date of Patent: * Dec. 5, 1995

[54] PROCESS FOR HYDRODEAROMATIZATION OF HYDROCARBON OILS USING CARBON SUPPORTED METAL SULFIDE CATALYSTS PROMOTED BY PHOSPHATE

[75] Inventors: Chakka Sudhakar, Wappingers Falls; Frank Dolfinger, Jr., Poughkeepsie; Max R. Cesar, Newburgh; Mahendra S. Patel, Hopewell Junction, all of N.Y.

[73] Assignee: Texaco Inc., White Plains, N.Y.

[*] Notice: The portion of the term of this patent subsequent to Oct. 13, 2012, has been disclaimed.

[21] Appl. No.: 287,738

[22] Filed: Aug. 9, 1994

[51] Int. Cl.$^6$ .................................................. C10G 45/46
[52] U.S. Cl. ........................ 208/143; 208/216 PP; 208/254 H; 208/216; 208/213; 585/266
[58] Field of Search .................. 208/138, 143, 208/216 R, 216 PP; 502/182–185; 585/266

[56] References Cited

U.S. PATENT DOCUMENTS

| | | | |
|---|---|---|---|
| 3,812,028 | 5/1974 | Wennerberg et al. | 208/112 |
| 3,997,473 | 12/1976 | Schmitt et al. | 208/216 |
| 4,032,435 | 6/1977 | Schmitt et al. | 208/216 |
| 4,082,652 | 4/1978 | Voorhies | 208/216 |
| 4,176,267 | 11/1979 | Ternar et al. | 208/112 |
| 4,313,852 | 2/1982 | Gavin et al. | 252/439 |
| 4,483,767 | 11/1984 | Antos et al. | 208/138 |
| 4,525,267 | 6/1985 | Inouka | 208/110 |
| 4,831,003 | 5/1989 | Lang et al. | 502/183 |
| 5,051,389 | 9/1991 | Lang et al. | 502/185 |

*Primary Examiner*—Helane Myers
*Attorney, Agent, or Firm*—James L. Bailey; Kenneth R. Priem; Cynthia L. Hunter

[57] ABSTRACT

A process for treating a charge hydrocarbon oil containing undesired aromatic components, sulfur and nitrogen compounds, which comprises maintaining a bed of a sulfided catalyst comprising 0.1 to 15% by weight of nickel; and from 1 to 50% by weight of tungsten and 0.01 to 10% by weight of phosphorus, on an activated carbon support, and passing a charge hydrocarbon feed in the presence of hydrogen into contact with said catalyst at hydrotreating conditions, thereby effecting hydrodearomatization, hydrodesulfurization and hydrodenitrogenation of said charge hydrocarbon feed containing undesired aromatic components, sulfur and nitrogen, and forming a product stream of hydrocarbon containing a lesser quantity of undesired aromatic components, sulfur and nitrogen; and recovering said product stream of hydrocarbon containing a lesser quantity of undesired aromatic components, sulfur and nitrogen.

19 Claims, No Drawings

PROCESS FOR HYDRODEAROMATIZATION OF HYDROCARBON OILS USING CARBON SUPPORTED METAL SULFIDE CATALYSTS PROMOTED BY PHOSPHATE

FIELD OF THE INVENTION

This application is related to U.S. application Ser. No. 08/287,979 pending.

This invention relates to a hydroprocessing catalyst composition comprising phosphate, a Group VIB metal and a Group VIII metal, on a high surface area carbon support, useful after sulfiding, for hydrodesulfurization (HDS), hydrodenitrogenation (HDN), hydrodeoxygenation (HDO), hydrodearomatization (HDAr), hydrogenation (HYD), hydrofining, hydrodemetallization, hydrocracking, and for other hydroprocessing reactions such as improving the hydrogen to carbon ratio, API gravity, color etc. of hydrocarbon oils. Promotion with phosphate dramatically improved the hydrodearomatization (HDAr) activities of sulfided carbon supported Ni-W catalysts.

This invention also relates to a process for the catalytic hydrodearomatization of middle distillates and naphthas using the sulfided, phosphate promoted Group VIII and Group VIB metal catalysts supported on activated carbon, to produce low aromatics containing fuels. Substantial HDS and HDN are also simultaneously accomplished along with HDAr over these catalysts, which is highly desirable.

With their extremely high hydrogenation activities, these improved carbon supported catalysts will be highly valuable for hydroprocessing in general and for the production of low aromatic gasoline, kerosine and diesel fuel in particular. This invention will be useful for hydrotreating/hydroprocessing/hydrofining various hydrocarbon feedstocks such as naphthas, middle distillates, gas oils, vacuum gas oils and resids, derived from any source such as petroleum, coal, oil shale, tar sands, and oil sands.

BACKGROUND OF THE INVENTION

Aromatic hydrocarbons in fuels such as gasoline or diesel oil represent a source of atmospheric pollution. The aromatic content of middle distillates may be as high as 85 vol %. An illustrative light straight run gas oil may for example be typically found to contain about 30 vol % aromatics. As environmental considerations become of greater concern, it is desirable to treat hydrocarbons such as naphthas and middle distillate hydrocarbons to decrease the content of undesirable aromatic components. Noble metal catalysts, which are excellent for aromatics saturation will quickly get poisoned by the sulfur and nitrogen compounds that are present in typical hydrocarbon feedstocks, and lose their hydrogenation activity in a short time. Therefore, noble metal catalysts can not be used for a one-step process for hydrodearomatizing these fuel feedstocks. Since the prior art hydroprocessing catalysts, typified by sulfided, alumina supported cobalt/nickel/molybdenum/tungsten, sometimes promoted by phosphorus or fluorine, do not have the catalytic activities necessary for producing a product having a very low aromatic content, it is desirable to find a hydrotreating catalyst with very high aromatics saturation activity.

U.S. Pat. No. 1,965,956 is directed to the hydrogenation of aromatic compounds to hydroaromatic compounds with a gas consisting substantially of hydrogen under a pressure of at least 100 atmospheres, at a temperature between 200° C. and 350° C., in the presence of a "mixed catalyst" comprising metal compounds of group 1, group 6 and group 8 of the periodic system, on a wide variety of catalyst supports including active charcoal. The catalysts of U.S. Pat. No. 1,965,956 can also contain "activating admixture" selected from compounds of elements of groups 2 to 5 and of group 7 of the periodic system.

U.S. Pat. No. 2,608,521 is specifically directed to an improved process for the desulfurization of "sulfur bearing" hydrocarbon oils using "sulfactive hydrogenation catalysts". The "sulfactive hydrogenation catalysts" of U.S. Pat. No. 2,608,521 can consist of "oxides or sulfides of the transition metals", with or without such stabilizers and promoters as the oxides and carbonates of a very large selection of metals, in combination with a large selection of various conventional supporting materials.

U.S. Pat. No. 3,367,862 is directed to desulfurization of heavy residual hydrocarbons by hydrolysis with water in the presence of catalyst on a charcoal base.

U.S. Pat. No. 3,546,103 is directed to the removal of metals and coke from hydrocarbon resids by use of, as pre-catalyst, metals of Group IIB or Group VIB plus Group VIII, on charcoal.

U.S. Pat. No. 3,725,303 is directed to treating of aqueous solutions of oxy-sulfur compounds (such as sodium thiosulfate) by use of a catalyst containing molybdenum sulfide and cobalt sulfide on a carbon support.

U.S. Pat. No. 3,812,028 is directed specifically to "hydrotreating" fossil fuels containing polynuclear aromatic such as asphaltenes, and for converting the components boiling above 1000° F. to products boiling below 1,000° F. (this is actually hydrocracking), by the use of Group VI and/or Group VIII metals on carbon, at a hydrogen partial pressure in excess of 2,200 psig and at a temperature between 750° F. and 850° F.

U.S. Pat. No. 3,997,473 (and its divisional U.S. Pat. No. 4,032,435) is directed to hydrodesulfurization of petroleum residues by use of a catalyst comprising cobalt/nickel/molybdenum/tungsten on a carbon support, the carbon support being characterized by an average pore radius of at least 25 Angstroms and a BET Surface area of 200–800 $m^2/g$. The catalyst of these patents has a loading of Group VIB metal "of at least 10 and up to about 20 weight percent expressed as metal oxide based on the weight of the catalyst support."

U.S. Pat. No. 4,082,652 is directed to treatment of heavy oils, to effect hydrodesulfurization by use of a molybdenum/nickel or molybdenum/cobalt on carbon catalyst. The catalyst preparation requires that the molybdenum be deposited first, then sulfided, and only then that the nickel or cobalt be added.

U.S. Pat. No. 4,176,051 is directed to a process for catalytically hydrocracking a heavy hydrocarbon oil, wherein the heavy hydrocarbon oil is slurried with a particulate catalyst mass comprising aluminum compound coated coal and/or coke particles which may also be coated with a cobalt and/or a molybdenum compound, and then reacted with hydrogen.

U.S. Pat. No. 4,313,852 is directed to hydrotreating, particularly of coal liquids, in the presence of a sulfided molybdenum or tungsten on active carbon, with or without a second metallic component, in which catalysts the metal sulfides are substantially completely on the outer surface of the active carbon support. The carbon supported catalyst preparation according to U.S. Pat. No. 4,313,852 must involve direct deposition of metal sulfides on the carbon support and subsequent reduction to lower valent sulfides.

U.S. Pat. No. 4,831,003 is directed to a catalyst composition, useful in hydrotreating processes, prepared by depositing a compound of a metal of Group IIB, IVB, IVA, VA, VIA, VIIA, or VIIIA onto a carbon support formed simultaneously with the deposition, by partial combustion of an unsaturated hydrocarbon. The deposited metal is thereafter converted to an oxide or sulfide.

U.S. Pat. No. 5,051,389 is directed to a method for preparing a catalyst composition for hydroconversion processes wherein the catalyst composition is formed by depositing one or more metal and/or metal compounds from vapor phase, at elevated temperatures, onto a preformed carbon support which has maximum dimension in any direction of about 50 Angstroms to about 5,000 Angstroms. The catalysts made according to U.S. Pat. No. 5,051,389 have to be added to or combined with the carbonaceous material to be hydrotreated in only 50 to 5,000 parts per million concentration, for the hydroconversion process to take place (one-pass application).

There is a continuing need in the art for catalysts which demonstrate improved hydrodearomatization of middle distillate hydrocarbons. It would be extremely valuable if a catalyst which performed better with respect to dearomatization were capable of simultaneously eliminating sulfur and nitrogen.

SUMMARY OF THE INVENTION

In accordance with certain of its aspects, this invention is directed to a process for treating a charge hydrocarbon containing undesired aromatic components, sulfur and nitrogen compounds which comprises maintaining a bed of sulfided catalyst comprising phosphate, a non-noble metal of Group VIII and a metal of VIB on a carbon support, passing a charge hydrocarbon in the presence of hydrogen into contact with said sulfided catalyst containing phosphate, a non-noble metal of Group VIII and a metal of Group VIB on a carbon support, at hydrotreating conditions thereby effecting hydrodearomatization, hydrodesulfurization and hydrodenitrogenation of said charge hydrocarbon containing undesired aromatic components, sulfur and nitrogen compounds, forming a product stream of hydrocarbon containing lesser quantities of undesired aromatic components, sulfur and nitrogen; and recovering said product stream of hydrocarbon containing lesser quantities of undesired aromatic components, sulfur and nitrogen.

DESCRIPTION OF THE INVENTION

The charge hydrocarbons which may be treated by the process of this invention include those which are commonly designated as naphthas, middle distillates or other heavier hydrocarbon feedstocks such as gas oils, vacuum gas oils, residua, shale oils, coal liquids, sand oils, etc. Naphthas, middle distillates and gas oils produced from fluid catalytic crackers, steam crackers and delayed cokers, which are sometimes called as cracked feedstocks are also included as charge hydrocarbons for this invention. Typically naphthas may have an initial boiling point (IBP) of at least about 70° F. and typically 80° F.–200° F. by ASTM distillation #D86. The charge middle distillates may have an IBP of at least about 300° F., and commonly about 300° F.–480° F.

These charge hydrocarbons may include naphtha (IBP of 70° F.–200° F.), kerosene (IBP of 300° F.–340° F.), light gas oil (IBP of 340° F.–480° F.), etc.

Many of these charge middle distillates may have an aromatic content as high as 80 vol %, typically 20 vol %–50 vol %, say 25 vol %–40 vol %. In addition to the undesired aromatic components, they may contain other undesirables such as sulfur (0.1 wt %–5 wt %, typically 1 wt %–4 wt %) and nitrogen (10–5,000 wppm, typically 0.001%–0.2 wt %).

A typical charge which may be treated by the process of this invention may be a light atmospheric gas oil (LAGO) having the following properties:

TABLE

| Property | Value |
|---|---|
| API Gravity | 32° |
| ASTM D86 Distillation: | |
| IBP °C. | 197 |
| 10% °C. | 263 |
| 50% °C. | 299 |
| 90% °C. | 344 |
| EP (End Point) °C. | 360 |
| Sulfur wt % | 0.71 |
| Nitrogen wppm | 500 |
| Aromatics wt % (ASTM D-5186) | 32 |

In practice of the process of this invention, the charge may be admitted to the catalyst bed at about 200° C.–450° C., preferably at 300° C.–410° C., say about 380° C., and 200–3,000 psig, preferably 400–2,500 psig, say 1,500 psig. Hydrogen is admitted at a flow rate of 200–10,000 SCFB, preferably 1,000–6,000 SCFB, say about 4,000 SCFB. Gas mixtures wherein hydrogen is the major component, say higher than about 60% by volume, may be employed instead of pure hydrogen gas. LHSV based on catalyst volume may be 0.1–10, preferably 0.5–4, say about 2.5. The process of the present invention can be effected in a fixed bed reactor system, ebullated bed reactor system, fluidized bed reactor system, or slurry reactor system. For naphthas and middle distillates, it is preferred to use extrudates, pellets, spheres or granules of the catalyst in a fixed bed reactor system.

The supported catalyst of this invention is preferably prepared on an activated carbon support. All carbons with B.E.T. surface areas more than 600 m$^2$/g, derived from any raw material such as coal, wood, peat, lignite, coconut shell, olive pits, synthetic polymers, coke, petroleum pitch, coal tar pitch, etc., are suitable as catalyst supports for the catalysts of the present invention. Carbon is generally characterized as "activated" if it contains an intricate network of internal porosity arising from the activation process. The primary particles in these activated carbon materials are much larger than 5,000 Angstroms in diameter.

The activated carbon support used for making the catalysts of this invention can exist in any physical form including, but not limited to powder, granules, pellets, spheres, fibres, monolith, or extrudates. It may contain a small concentration of phosphorus of the order of about 1 wt. % or less, as a consequence of its manufacturing process. It may also contain one or more refractory inorganic oxides as minor components, total of these being less than about 30 wt. %.

We believe that the added phosphorus promoter of the instant invention primarily exists in the final catalyst as phosphate species in most cases. However, other phosphorus containing species are not excluded. Expressed as elemental phosphorus, it can exist in an amount of 0.01 to 10% by weight of the total catalyst and preferably about 0.1 to 5% by weight. In general, any inorganic, organic or organometallic phosphorus compounds can be used as precursors for phosphate in the final catalyst. Suitable phosphorus compounds include, but are not limited to ammonium dihydrogen phosphate, diammonium hydrogen phosphate, triethyl phosphate, aniline phosphate, urea phosphate, phosphoric acid, polyphosphoric acid, metaphosphoric acid, phosphorous pentoxide, phosphorus pentasulfide, and pyrophosphoric acid.

The Total Surface Area (Brunauer-Emmett-Teller, BET) of the carbon support should be at least about 600 m$^2$/g, and typically between 600 m$^2$/g and 2,000 m$^2$/g. The preferred range is between 600 and 1600 m$^2$/g. The Total Pore Volume (TPV) for nitrogen is at least about 0.3 cc/g, preferably 0.4–1.2 cc/g, say 0.8 cc/g. The Average Pore Diameter by nitrogen physisorption, is in the range of 12–100 Angstroms, preferably 16–50 Angstroms, say 30 Å. Preferably 20–80% of the total pore volume of the carbon support should exist in pores in the mesopore range (20–500 Å diameter).

Suitable commercially available carbon pellets, granules, or extrudates which may be used as catalyst supports in fixed beds in the practice of the process of this invention may include:

A. A commercially available activated carbon known by the brand name, Nuchar BX-7530 carbon obtained from the Westvaco Company as ⅛" pellets, having a Brunauer-Emmett-Teller (BET) surface area of 1128 m$^2$/g, a nitrogen pore volume (TPV) of 0.82 cc/g (for nitrogen), Average Pore Diameter estimated using the Wheeler equation Average Pore Diameter (Å)=[40,000×TPV (cc/g)]/Surface Area (m$^2$/g)

of 29.2 Å calculated from nitrogen physisorption data, an apparent bulk density of 0.37 g/cc and an ash content of less than 7 wt %.

B. The Atochem ACP carbon (of the Atochem Company) pellets (4 mm diameter) having a surface area (BET) of 997 m$^2$/g, a TPV of 0.59 cc/g (for nitrogen), Average Pore Diameter of 23.6 Å, and an apparent bulk density of 0.40 g/cc.

The desired hydrodearomatization of hydrocarbons according to this invention is accomplished by use of a catalyst prepared from the carbon support characterized by a BET surface area of at least about 600 m$^2$/g, by a Total Pore Volume of at least about 0.3 cc/g, and by an average Pore Diameter of at least 12 Å which has deposited thereon 1–50 wt % of VIB metal, 0.1–15 wt % of non-noble Group VIII metal, and 0.01–10 wt % added phosphorus expressed as elemental phosphorus but existing as phosphate in the catalyst, based on the final catalyst weight. The catalysts of the present invention can also contain additional promoters such as Boron, at 0.01% to 4% by weight, calculated as elemental boron based on the total catalyst weight.

The catalytic metals may be deposited on the carbon, in the form of inorganic, organic or organometallic compounds of the metals, either sequentially or simultaneously, by various processes known in the art including incipient wetness impregnation, equilibrium adsorption etc., from aqueous or non-aqueous media, or from vapor phase using volatile compounds of the metals. The catalysts can also be prepared by solid state synthesis techniques such as, for example, grinding together the support and the metal compounds in a single step or in multiple steps, with suitable heat treatments.

It is to be noted that Cr, Mo, W, Ni, Fe and Co exist as oxides or as partially decomposed metal compounds which are precursors to the oxides. All the metals and the phosphate promoter can be deposited in any order on the carrier, either in a single step or in multiple steps via solid state techniques or solution impregnation from aqueous or non-aqueous media, with heat treatment in between.

The chromium and/or molybdenum together can constitute from 1 to 20% by weight, expressed as elemental chromium or molybdenum, based on the final catalyst weight. The preferred range is 5–18% by wt., say about 12% by weight. The tungsten can constitute 1–50% by wt., preferably 10–45% by weight, say about 37% wt %, expressed as elemental tungsten, based on the final catalyst weight. Tungsten is the preferred Group VIB metal.

The non-noble Group VIII metal may preferably be one or more metals selected from cobalt, iron or nickel. The final catalyst can constitute 0.1–15% by weight selected from one or more of nickel, cobalt and iron. The preferred range for one or more metals selected from nickel, iron or cobalt is from 2 to 12% by wt., say about 7 wt. %, expressed as elemental cobalt, iron or nickel, based on final catalyst weight. Nickel is the preferred non-noble Group VIII metal.

The Group VIB metal may be loaded onto the catalyst support from a preferably aqueous solution of ammonium metatungstate. The Group VIII non-noble metal may be loaded onto the catalyst support preferably from an aqueous solution of nickel nitrate hexahydrate.

Although the metals and phosphorus may be deposited on the catalyst support in any order, either in a single step or in multiple steps, it is preferred to deposit the phosphorus first, then the Group VIB metal and thereafter the non-noble Group VIII metal with a drying/calcining step between each loading. Alternatively, phosphorus may be deposited on the catalyst support along with the Group VIB metal in the first step.

In a preferred embodiment, carbon pellet support is contacted with a phosphorus compound solution (preferably an aqueous solution), the phosphorus compound being typically ammonium dihydrogen phosphate (NH$_4$)H$_2$PO$_4$, in total solution volume enough to fill the pores of the carbon support to incipient wetness. The support bearing the phosphorus compound is allowed to stand at room temperature for 0.5–4 hours, say 2 hours, and then heated at a rate of 0.3° C./min to 115° C. in air or nitrogen, maintained at that temperature for 2–48 hours, say 24 hours, and then cooled to room temperature over 2–6 hours, say 3 hours. Temperatures higher than 115° C. may be employed, but must be limited to less than 450° C. Multiple depositions may be employed to prepare catalysts with the desired phosphorous loading.

The carbon pellet support bearing the phosphate component is then contacted with an aqueous solution of a salt of the Group VIB metal, preferably ammonium metatungstate, (NH$_4$)$_6$H$_2$W$_{12}$O$_{40}$ in an amount to fill the pores to incipient wetness. The support bearing phosphorus and the Group VIB metals is typically allowed to stand at room temperature for 0.5–4 hours, say 2 hours, and then heated in air or inert atmosphere at a rate of 0.3° C./min to 115° C., maintained at that temperature for 12–48 hours, say 24 hours, and then cooled to room temperature over 2–6 hours, say 3 hours. Temperatures higher than 115° C. may be employed, but are limited to about 500° C. Multiple impregnation may be employed to prepare catalysts with desired Group VIB metal loading.

Thereafter the support bearing phosphorus and Group VIB metal is contacted with an aqueous solution of the non-noble Group VIII metal, preferably nickel nitrate hexahydrate, in amount to fill the pores to incipient wetness. The support bearing phosphorus, Group VIB metal and Group VIII metal is typically allowed to stand at room temperature for 0.5–4 hours, say 2 hours, and then heated in air or inert atmosphere, at a rate of 0.3° C./min to 115° C., maintained at that temperature for 12–48 hours, say 24 hours and then cooled to room temperature over 2–6 hours, say 3 hours. Temperatures higher than 115° C. may be employed, but are limited to about 500° C. Multiple impregnations may be employed to prepare catalysts with desired Group VIII metal loading.

The catalyst so prepared contains 1–50 wt %, preferably 5–18 wt %, say 12 wt %, of molybdenum or chromium of the Group VIB (measured as metal); 0.1–15 wt %, preferably 2–12 wt %, say 7 wt %, of Group VIII metal (measured as metal); and 0.01–10 wt %, preferably 0.1–5 wt %, say 3 wt % phosphorus (calculated as elemental phosphorus). When the VIB metal is the preferred tungsten, it may be present in amount of 1–50 wt %, preferably 10–45 wt %, say 37 wt %.

In a typical process according to the present invention, the catalyst, bearing phosphorus, Group VIB and non-noble Group VIII metals, is loaded into a hydrotreating reactor and sulfided in situ to convert the W and Ni compounds to their respective sulfides to a significant extent.

The sulfiding can be accomplished using any method known in the art such as for example, by heating in a stream of hydrogen sulfide in hydrogen or by flowing an easily decomposable sulfur compound such as carbon disulfide or dimethyl disulfide in a hydrocarbon solvent over the catalyst at elevated temperatures up to, but not limited to 450° C. at atmospheric or higher pressures, in the presence of hydrogen gas for 2–24 hours, say 3 hours.

Alternatively, the sulfiding can also be effected by the sulfur compounds present in the hydrocarbon charge itself which is being hydrotreated. The catalyst can also be pre-sulfided outside the reactor, suitably passivated and then loaded into the reactor. After sulfiding, the hydrocarbon charge is passed through the catalyst bed together with hydrogen gas at pressures ranging from 200–3000 psi and temperatures ranging from 200°–450° C. at liquid hourly space velocities (LHSV) ranging from 0.1 to 10. Pure hydrogen gas or recycle gas containing largely hydrogen can be used at flow rates ranging from 200–10000 SCFB.

Ex-situ sulfiding can be accomplished using any of the known techniques described in literature. If sufficient amount of sulfur is incorporated into the catalyst using one of these ex-situ presulfiding techniques, activation of the catalyst might be accomplished by heating the catalyst in hydrogen flow in the reactor itself.

Practice of the process of this invention can be carried out by passing the charge naphtha or middle distillate hydrocarbon into contact with the sulfided catalyst at 200° C.–450° C., say 380° C. and 200–3,000 psig, say 1,500 psig, at LHSV (based on catalyst volume) of 0.1–10, say 2.5, with hydrogen gas flow rates of 200–10,000, say 4,000 SCFB. Gas mixtures wherein hydrogen is the major component, say higher than about 60% by volume, may be employed instead of pure hydrogen gas.

During hydrodearomatization, it is found that the aromatic content may be decreased from a charge content of 25–40 wt %, say 32 wt %, down to a product content of 10–16 wt %, say 13 wt %. In the case for example of a light atmospheric gas oil (LAGO) containing 32 wt % aromatics, this content may be reduced to approximately 10 wt % in a typical operation. Most of the sulfur and nitrogen present in the hydrocarbon charge may also be eliminated during the process of the present invention.

Practice of the process of this invention will be apparent to those skilled in the art from the following wherein all parts are parts by weight unless otherwise stated. An asterisk (*) indicates a control example. The activated carbon support used to prepare the catalysts in the following examples is the commercially available activated carbon known by the brand name, Nuchar BX-7530 carbon obtained from the Westvaco Company as ⅛" pellets, having a Brunauer-Emmett-Teller (BET) surface area of 1128 $m^2/g$, a nitrogen pore volume (TPV) of 0.82 cc/g (for nitrogen), Average Pore Diameter estimated using the Wheeler equation Average Pore Diameter (Å)=[40,000×TPV (cc/g)]/Surface Area $(m^2/g)$ of 29.2 Å calculated from nitrogen physisorption data, an apparent bulk density of 0.37 g/cc and an ash content of less than 7 wt %.

EXAMPLE 1

PREPARATION OF Ni-W-P/Carbon CATALYST (CATALYST C1)

Step 1:

4.0 parts of ammonium dihydrogen phosphate, $(NH_4)H_2PO_4$, was dissolved in 41 parts of deionized water. 40 parts of the carbon, as 20–40 mesh particles, was impregnated to incipient wetness with the ammonium phosphate solution. The impregnated material is allowed to stay at room temperature for about 2 hours in a hood, and then was heated slowly at a rate of 0.3° C./min to 115° C. in an oven in air, was left at that temperature for 24 hours, and was cooled slowly to room temperature in about 3 hours.

Step 2:

45.5 parts of ammonium metatungstate (AMT), $(NH_4)_6H_2W_{12}O_{40}$, was dissolved in 39.5 parts of deionized water. The product material from step 1 above, was impregnated with this solution to incipient wetness. The impregnated material was left at room temperature with occasional stirring for 2 hours. It was then heated slowly at a rate of 0.3° C./min to 115° C. in an oven in air, was left at that temperature for 24 hours, and was cooled slowly to room temperature in 3 hours.

Step 3:

The material from Step 2 above was impregnated to incipient wetness with a solution made up of 33.1 parts of nickel (II) nitrate hexahydrate (Ni nitrate) in 19 parts of deionized water. The impregnated material was heat treated in the same way as in Step 1.

The resulting material is referred to as Catalyst C1. If all the AMT and Ni nitrate were decomposed to the respective oxides and ammonium dihydrogen phosphate to $H_3PO_4$, then Catalyst C1 would contain nominally 35.9% by weight W, 7.0% by weight Ni, and 1.1% by weight added Phosphorus (expressed as elemental phosphorus, but existing as phosphate), based on the final catalyst weight.

EXAMPLE 2

PREPARATION OF Ni(W+P)/Carbon CATALYST (CATALYST C2)

Step 1:

45.5 parts of ammonium metatungstate (AMT), $(NH_4)_6H_2W_{12}O_{40}$, together with 5.5 parts of ammonium dihydrogen phosphate, $(NH_4)H_2PO_4$ were dissolved in 39 parts of deionized water. 40 parts of the carbon as 20–40 mesh particles were impregnated with this solution to incipient wetness. The impregnated material was left at room temperature with occasional stirring for 2 hours. It was then heated slowly at a rate of 0.3° C./min to 125° C. in an oven in air, left at that temperature for 24 hours and cooled slowly to room temperature in 3 hours.

Step 2:

The material from Step 1 above was impregnated to incipient wetness with a solution made up of 33.1 parts of nickel (II) nitrate hexahydrate, (Ni nitrate), in 18.5 parts of deionized water. The impregnated material was heat treated in the same way as in Step 1.

The resulting material is referred to as Catalyst C2. If all the AMT and Ni nitrate were decomposed to their respective oxides, and ammonium dihydrogen phosphate to $H_3PO_4$, then the Catalyst C2 would contain nominally 35.4% by weight W, 6.9% by weight Ni and 1.6% by weight added Phosphorus (expressed as elemental phosphorus, but existing as phosphate), based on the final catalyst weight.

EXAMPLE 3* (Control)

Preparation of Ni-W/Carbon Catalyst (CATALYST C3)

Step 1:

45.5 parts of ammonium metatungstate, $(NH_4)_6H_2W_{12}O_{40}$, was dissolved in 39.5 parts of deionized water. 40 parts of Carbon support of 20–40 mesh size was impregnated with this solution to incipient wetness. The impregnated material was left at room temperature with occasional stirring for 2 hours. It was then heated slowly at a rate of 0.3° C./min to 115° C. in an oven in air, was left at that temperature for 24 hours and was cooled slowly to room temperature in 3 hours.

Step 2:

The product material from Step 1 above was impregnated to incipient wetness with a solution made up of 33.1 parts of Ni nitrate in 19 parts of deionized water. The impregnated material was heat treated in the same way as in Step 1.

The resulting material is referred to as Catalyst C3*. If all the AMT and Ni nitrate were decomposed to the respective oxides, Catalyst C3 would contain nominally 37% by weight W and 7.5% by weight Ni, based on the final catalyst weight.

TABLE 1

Summary of Catalyst Examples

| CATA-LYST | CATALYST DESCRIPTION | wt. % W | wt. % Ni | Added wt. % Phosphorus |
|---|---|---|---|---|
| C1 | Ni—W—P/Carbon | 35.9 | 7.0 | 1.1 |
| C2 | Ni—(W + P)/Carbon | 35.4 | 6.9 | 1.6 |
| C3 | Ni—W/Carbon | 37.0 | 7.5 | None |

EVALUATION OF CATALYSTS

Catalysts C1, C2 and C2* were evaluated for their Hydrodesulfurization (HDS), Hydrodenitrogenation (HDN) and Hydrodearomatization (HDAr) activities in a standard hydrotreating reactor system using techniques well-known to those familiar with the art. In a typical experiment, 20 cc of the catalyst is loaded into the hydrotreating reactor of 12 mm ID and 40 cm long. After purging off of oxygen from the reactor, 100 cc/min of a sulfiding gas, 10% $H_2S$ in hydrogen, is passed over the catalyst for 15 minutes at room temperature at 1 atmosphere pressure. With the sulfiding gas flowing, the temperature of the reactor is increased at 3° C./min to 350° C. and kept at the sulfiding temperature of 350° C. for 2 hours. The temperature of the reactor is then changed to the reaction temperature, the sulfiding gas still flowing. At this point, a back pressure of about 100–400 psig is applied to the reactor and the liquid feed flow is started at the desired rate. Once the liquid had passed beyond the catalyst bed, the flow of the sulfiding gas is cut off, the flow of hydrogen started at the desired rate and the reactor pressure increased to the desired value. The actual hydrotreating reaction is considered to have started at this point of time.

After about 20 hours on stream, the liquid product samples were collected and were sparged with hydrogen gas to remove the dissolved $H_2S$ and $NH_3$ gases before they were analyzed for their sulfur, nitrogen and aromatics contents. The extent of sulfur removal (%HDS), nitrogen removal (%HDN) and aromatics saturation (%HDAr) are calculated from these analyses.

The liquid feed used for all the experiments presented here was a light atmospheric gas oil (LAGO) having the properties and composition given in Table 2. It should be mentioned here that even though LAGO was used as the feed in the examples presented here, the catalysts of the present invention are applicable for processing various hydrocarbon feed fractions ranging from naphthas to vacuum gas oils and resids.

TABLE 2

Properties of LAGO

| | |
|---|---|
| API Gravity | 32° |
| IBP (ASTM #D86) | 197° C. |
| 10% | 263° C. |
| 50% | 299° C. |
| 90% | 344° C. |
| FBP | 360° C. |
| Sulfur, wt % | 0.71 |
| Nitrogen, ppm wt. | 500 |
| Aromatics (wt %) (ASTM #5186) | 32 |

The Sulfur and Nitrogen concentrations of the feed and product samples were determined by X-ray fluorescence (XRF), ASTM# D2622 and Chemiluminescence techniques respectively. The weight percent aromatics in the feed as well as in the product samples were measured by Supercritical Fluid Chromatography (SFC), ASTM #5186. The particular two sets of reaction conditions namely, [340° C. temperature, 800 psig total pressure, LHSV=2.0, and $H_2$ flow rate=2000 SCFB], and [385° C. temperature, 1500 psig total pressure, LHSV=2.5, and $H_2$ flow=4000 SCFB], employed in the present experimental runs were chosen in such a way that only partial HDS and HDN under the first set of conditions, and partial HDAr under the second set of conditions occur. This helps us to compare the HDS, HDN and HDAr activities of different catalysts at identical reaction conditions, in order to rank them.

Table 3 presents the results of catalyst evaluations under the first set of reaction conditions, for the hydroprocessing of the LAGO, the properties of which are given in Table 2. Presented in Table 3, in the order of the number of column, are the Run#, catalyst, catalyst description, % HDS, and % HDN. The results presented are on EQUAL CATALYST VOLUME basis. The liquid hourly space velocity (LHSV), process temperature, total pressure and rate of hydrogen flow for all the experiments were 2.0 $hr^{-1}$, 340° C., 800 psig and 2000 SCFB, respectively.

TABLE 3

Results of Catalyst Evaluations

| Run # | Catalyst | Catalyst Description | % HDS | % HDN |
|---|---|---|---|---|
| 1 | C1 | Ni—W—P/Carbon | N.D. | N.D. |
| 2 | C2 | Ni—(W + P)/Carbon | 87.3 | 55.4 |
| 3 | C3* | Ni—W/Carbon | 88.8 | 56.0 |

N.D. = Not Determined

Table 4 presents the results of catalyst evaluation under the second set of reaction conditions, for the hydroprocessing of the LAGO the properties of which are given in Table 2. Presented in Table 4, in the order of the number of column, are the Run#, catalyst, catalyst description, wt. % P added, % HDS, % HDN, % HDAr, and the first order rate constant for HDAr. The results presented are on EQUAL CATALYST VOLUME basis. The liquid hourly space velocity (LHSV), process temperature, total pressure and rate of hydrogen flow for all the experiments in table 4 were 2.5 hr$^{-1}$, 385° C., 1500 psig and 4000 SCFB respectively.

TABLE 4

Results of Catalyst Evaluations

| Run # | Catalyst | Catalyst Description | Wt % P Added | % HDS | % HDN | % HDAr | $k_1$ (HDAr) |
|---|---|---|---|---|---|---|---|
| 1 | C1 | Ni—W—P/Carbon | 1.1 | 99.9 | 99.8 | 59.5 | 4.52 |
| 2 | C2 | Ni—W—P/Carbon | 1.6 | 99.7 | 99.4 | 48.6 | 3.33 |
| 3 | C3 | Ni—W/Carbon | None | 99.4 | 99.8 | 39.8 | 2.54 |

The following observations/conclusions can be made from the data presented in Tables 3 and 4.

(a) The phosphate promoted Ni-W/Carbon catalysts of the present invention are clearly significantly more active for the Hydrodearomatization of LAGO than the unpromoted Ni-W/Carbon catalyst. From the first order rate constant values for HDAr, promoting the catalyst with as little as 1.1 wt % added phosphorus improved the HDAr activity of the catalyst by as much as 78%. An improvement of this magnitude is not possible with any teachings in the art, is quite unexpected and is unattainable without the instant inventive concept.

(b) The improvement in the HDAr activity of the phosphate promoted catalysts seems to be a function of added phosphorus level; this activity improvement probably goes through a maximum.

(c) The effect of added phosphorus on the HDS and HDN activities does not appear to be significant.

What is claimed:

1. A process for treating a charge hydrocarbon oil containing undesired aromatic components, sulfur and nitrogen compounds, which comprises:

maintaining a bed of a sulfided catalyst comprising 0.1 to 15% by weight of nickel; and from 1 to 50% by weight of tungsten and 0.01 to 10% by weight of phosphorus, on an activated carbon support, wherein the activated carbon support is characterized by a surface area of 600 to 2000 m$^2$/g, a pore volume for nitrogen of at least 0.3 cc/g and an average pore diameter of 12 to 100 Å;

passing a charge hydrocarbon feed in the presence of a gas selected from pure hydrogen and a gas mixture comprising greater than 60% by volume pure hydrogen into contact with said catalyst at hydrotreating conditions of 200° C.–450° C., a pressure of 200–3000 psig, a liquid hourly space velocity of 0.1–10 LHSV and a hydrogen feed rate of 200–10,000 SCFB, thereby effecting hydrodearomatization, hydrodesulfurization and hydrodenitrogenation of said charge hydrocarbon feed containing undesired aromatic components, sulfur and nitrogen compounds, and forming a product stream of hydrocarbon containing a lesser quantity of undesired aromatic components, sulfur and nitrogen; and recovering said product stream of hydrocarbon containing a lesser quantity of undesired aromatic components, sulfur and nitrogen.

2. The process of claim 1 wherein the hydrocarbon oil is selected from the group consisting of naphthas, middle distillates, gas oils, vacuum gas oils and vacuum resids, derived.

3. The process of treating a charge hydrocarbon containing undesired aromatic components, sulfur and nitrogen compounds, as claimed in claim 1 wherein said charge hydrocarbon is a straight run or cracked naphtha.

4. The process of treating a charge hydrocarbon containing undesired aromatic components, sulfur and nitrogen compounds, as claimed in claim 1 wherein said charge hydrocarbon is a straight run or cracked middle distillate.

5. The process of treating a charge hydrocarbon containing undesired aromatic components, sulfur and nitrogen compounds, as claimed in claim 1 wherein said charge hydrocarbon is a straight run or cracked gas oil.

6. The process of treating a charge hydrocarbon containing undesired aromatic components, sulfur and nitrogen compounds, as claimed in claim 1 wherein said charge hydrocarbon is a diesel fuel or a jet fuel.

7. The process of treating a charge hydrocarbon containing undesired aromatic components, sulfur and nitrogen compounds, as claimed in claim 1 wherein said charge hydrocarbon is a kerosene or a heavy naphtha.

8. The process of treating a charge hydrocarbon containing undesired aromatic components, sulfur and nitrogen compounds, as claimed in claim 1 wherein said hydrotreating conditions include a temperature of 300° C.–410° C., pressure of 400–2500 psig, a liquid hourly space velocity LHSV of 0.5–4 and hydrogen feed rate of 1000–6000 SCFB.

9. The process of claim 1 wherein the carbon supported catalyst contains 0.1 to 15% by weight nickel, 1 to 50% by weight tungsten and 0.01 to 10% by weight phosphorus.

10. The process of claim 1 wherein the carbon supported catalyst contains 10 to 45% by weight tungsten and, optionally, 5 to 18% chromium and/or molybdenum.

11. The process of claim 1 wherein the carbon supported catalyst consists essentially of 2 to 12% by weight nickel, and optionally 2 to 12% by weight cobalt and/or iron.

12. The process of claim 1 wherein the carbon supported catalyst contains 0.1 to 5% by weight phosphorus.

13. The process of claim 1 wherein the carbon supported catalyst contains 0.01 to 4% by weight boron.

14. The process of treating a charge hydrocarbon containing undesired aromatic components, sulfur and nitrogen compounds, as claimed in claim 1 wherein said carbon support is characterized by a BET surface area of at least about 600 m$^2$/g, a total pore volume for nitrogen of at least about 0.3 cc/g, and an average pore diameter, calculated from nitrogen physisorption of at least about 12 Å.

15. The process of claim 1 wherein the carbon support is characterized by having 20 to 80% of its pore volume in pores of 20–500 Å diameter.

16. The process of claim 1 wherein the carbon support is characterized by a BET surface area of 600–1600 m$^2$/g.

17. The process of claim 1 wherein the carbon support is characterized by an average pore diameter of 16–50 Å.

18. The process of claim 1 for treating a charge hydrocarbon containing undesired aromatic components, sulfur and nitrogen compounds, wherein said carbon support is a carbon pellet, monolith, or extrudate.

19. A process for treating a charge hydrocarbon oil containing undesired aromatic components, sulfur and nitrogen compounds, which comprises:

maintaining a bed of a sulfided metal catalyst comprising 0.1 to 15% by weight of nickel; and from 1 to 50% by weight of tungsten and 0.01 to 10% by weight of phosphorus, on an activated carbon support, wherein the activated carbon support is characterized by a surface area of 600 to 2000 m$^2$/g, a pore volume for nitrogen of at least 0.3 cc/g and an average pore diameter of 12 to 100 Å;

passing a charge hydrocarbon feed in the presence of a gas selected from pure hydrogen and a gas mixture comprising greater than 60% by volume hydrogen into contact with said catalyst at hydrotreating conditions, thereby effecting hydrodearomatization, hydrodesulfurization and hydrodenitrogenation of said charge hydrocarbon feed containing undesired aromatic components, sulfur and nitrogen compounds, and forming a product stream of hydrocarbon containing a lesser quantity of undesired aromatic components, sulfur and nitrogen; and recovering said product stream of hydrocarbon containing a lesser quantity of undesired aromatic components, sulfur and nitrogen.

\* \* \* \* \*